(12) United States Patent
Cakulev et al.

(10) Patent No.: US 11,490,320 B2
(45) Date of Patent: Nov. 1, 2022

(54) SYSTEMS AND METHODS FOR SUBSCRIBER LEVEL ADMISSION CONTROL AND PREEMPTION IN A NETWORK SLICE

(71) Applicant: Verizon Patent and Licensing Inc., Basking Ridge, NJ (US)

(72) Inventors: Violeta Cakulev, Millburn, NJ (US); Sudhakar Reddy Patil, Flower Mound, TX (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/197,676

(22) Filed: Mar. 10, 2021

(65) Prior Publication Data

US 2022/0295380 A1 Sep. 15, 2022

(51) Int. Cl.
*H04W 48/06* (2009.01)
*H04W 72/10* (2009.01)
*H04W 28/24* (2009.01)
*H04W 60/06* (2009.01)
*H04W 28/08* (2009.01)
*H04W 8/18* (2009.01)
*H04W 48/16* (2009.01)

(52) U.S. Cl.
CPC .............. *H04W 48/06* (2013.01); *H04W 8/18* (2013.01); *H04W 28/0925* (2020.05); *H04W 28/0992* (2020.05); *H04W 28/24* (2013.01); *H04W 48/16* (2013.01); *H04W 60/06* (2013.01); *H04W 72/10* (2013.01)

(58) Field of Classification Search
CPC ............... H04W 8/18; H04W 28/0925; H04W 28/0992; H04W 28/24; H04W 48/06; H04W 48/16; H04W 60/06; H04W 72/10
See application file for complete search history.

(56) References Cited

U.S. PATENT DOCUMENTS

2020/0196183 A1\* 6/2020 Mehta .................... H04W 40/22
2020/0344638 A1\* 10/2020 Ding ................. H04W 28/0268

FOREIGN PATENT DOCUMENTS

WO WO-2021218391 A1 \* 11/2021

\* cited by examiner

*Primary Examiner* — Khoa Huynh

(57) ABSTRACT

Systems and methods described herein employ an allocation and retention priority for user equipment (UE), referred to as a UE ARP. The UE ARP may be defined per network slice, such that a subscriber can have different priority in different slices. According to one implementation, a network device receives, from a UE device, a registration request requesting access to a network slice and obtains a UE ARP. The UE ARP associates the UE device with a priority level on the network slice. When the network device determines that a maximum number of terminals are using the network slice, it applies the priority level in the UE ARP to grant or deny the UE device access to the network slice.

20 Claims, 6 Drawing Sheets

400 ⇾

| Attribute name | Data type | P | Cardinality | Description |
|---|---|---|---|---|
| UeSnssaiArp | Map(ueSnssaiARP) | M | 1..N | Defines UE ARP per S-NSSAI for all the S-NSSAIs of the subscriber. The key of the map is the S-NSSAI. |

| | Attribute name | Data type | P | Cardinality | Description |
|---|---|---|---|---|---|
| 455 → | snssai | Snssai value | M | 1 | S-NSSAI associated with the data |
| 460 → | priorityLevel | ArpPriorityLevel (1, 2, 3, ...) | M | 1 | Defines the relative importance of a resource request |
| 465 → | uePreemptCap | UePreemption Capability (Y/N) | M | 1 | Defines whether a UE may get resources that were already assigned to another UE with a lower priority level |
| 470 → | uePreemptVuln | UePreemption Vulnerability (Y/N) | M | 1 | Defines whether a UE may lose the resources assigned to it in order to admit a UE with higher priority level |

FIG. 4B

SYSTEMS AND METHODS FOR SUBSCRIBER LEVEL ADMISSION CONTROL AND PREEMPTION IN A NETWORK SLICE

BACKGROUND

Advanced wireless networks, such as Fifth Generation (5G) networks, may use network slicing to increase network efficiency and performance. Network slicing involves a form of virtual network architecture that enables multiple logical networks to be implemented on top of a shared physical network infrastructure using software defined networking (SDN) and/or network function virtualization (NFV). Each logical network, referred to as a "network slice," may encompass an end-to-end virtual network with dedicated storage and/or computational resources that include access network components, clouds, transport, Central Processing Unit (CPU) cycles, memory, etc. Furthermore, each network slice may be configured to meet a different set of requirements and be associated with a particular Quality of Service (QoS) class, a type of service, and/or a particular group of enterprise customers associated with mobile communication devices and/or fixed wireless access (FWA) devices.

BRIEF DESCRIPTION OF THE DRAWINGS

FIGS. 4A and 4B are diagrams illustrating parameters of a user equipment allocation and retention priority (UE ARP) data type;

DETAILED DESCRIPTION OF THE PREFERRED EMBODIMENTS

The following detailed description refers to the accompanying drawings. The same reference numbers in different drawings may identify the same or similar elements.

Network slicing is a key feature of 5G networks and enables building of dedicated logical networks on shared infrastructure. Standardized attributes that can characterize a network slice include the number of terminals, which may indicate a maximum number of terminals that can use the network slice simultaneously. Admission control is an integral part of enforcing the maximum number of terminals on a network slice.

Admission control may be a validation process in communication systems where checks are performed before a connection between a device and the system is established to see if current resources are sufficient for the proposed connection. For the purpose of admission control, an allocation and retention priority (ARP) data element may be used to indicate a priority level for the allocation and retention of service data flows. A mobile network may use the ARP to decide whether to accept a request to establish a service data flow or reject the request when resources are limited.

ARP may include information about the priority level, the preemption capability and the preemption vulnerability. The ARP priority level defines the relative importance of a resource request when deciding whether a new service data flows may be accepted or needs to be rejected in the case of resource limitations. The ARP preemption capability defines whether a service data flow may get resources that were already assigned to another service data flow with a lower ARP priority level. The ARP preemption vulnerability defines whether a service data flow may lose the resources assigned to it in order to admit a service data flow with higher ARP priority level.

While the ARP has been implemented for service data flows, there currently is no notion of per-subscriber priority that could assist in prioritizing one subscriber over the other when the maximum number of terminals (also referred to as "UE devices" or "UEs") in a slice is reached. Under current ARP practices, a mobile carrier cannot ensure that highest priority subscribers will be able to access the mobile network once the maximum number of terminals in a slice is reached.

Systems and methods described herein introduce allocation and retention priority for a UE (referred to herein as "UE ARP"). The UE ARP may be defined per slice, and a subscriber potentially can have different priority in different slices.

Figure 1:
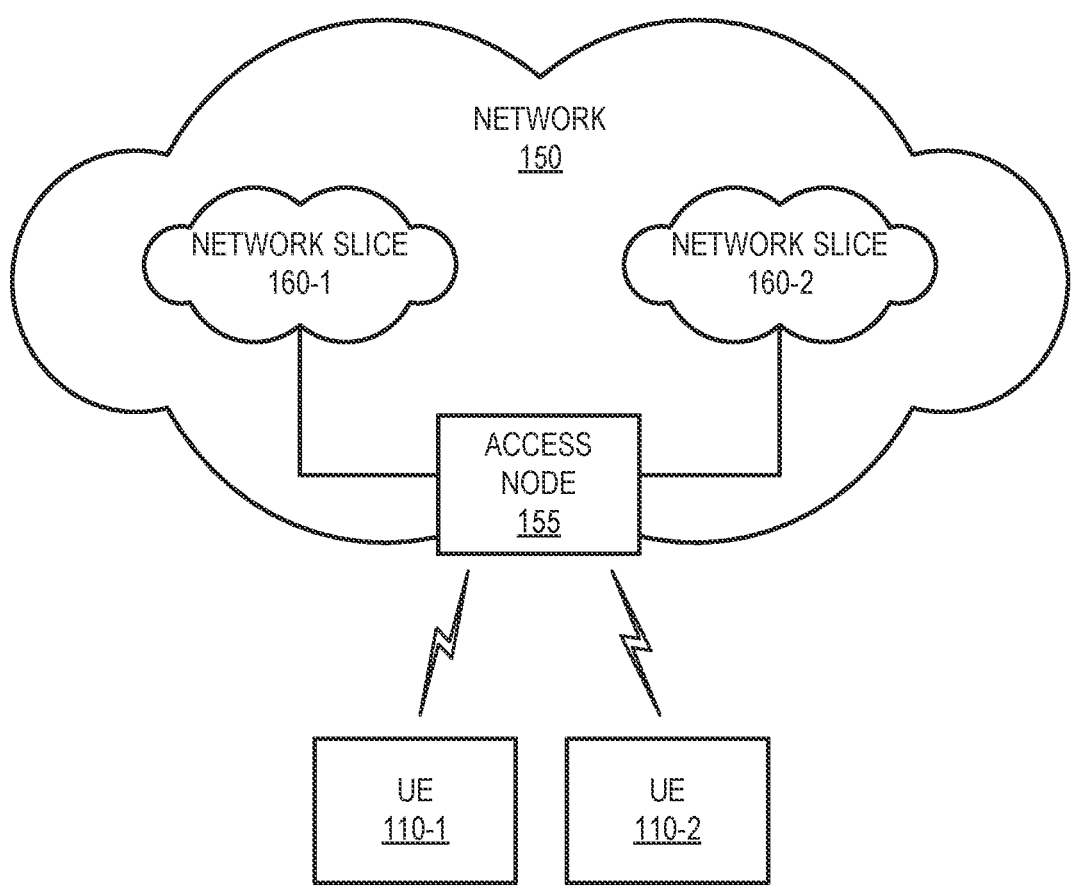
FIG. 1 is a diagram illustrating concepts described herein.

FIG. 1 illustrates the concepts described herein. As shown, UEs 110-1 and 110-2 may establish wireless links to a network 150 through an access node 155 (e.g., components of a gNodeB or a base station). Network 150 may include, for example, a mobile network that provides various communications-related services (e.g., an Internet service, a Short Messaging Service (SMS), a Voice-over-IP (VoIP) service, video streaming service, etc.). In the particular illustration of FIG. 1, network 150 may offer an emergency call handling service and an Internet service. Network 150 may implement these services on a network slice 160-1 (for emergency call handling) and a network slice 160-2 (for Internet).

Assume that UE 110-1 is associated with a first responder (not shown) and is assigned a high priority level for emergency call handling (e.g., slice 160-1) and a normal priority for Internet traffic (e.g., slice 160-2). Also, assume that UE 110-2 is associated with a residential customer (not shown) and is assigned a low priority level for emergency call handling (slice 160-1) and a normal priority for Internet traffic (e.g., slice 160-2).

Assume UE 110-2 is connected on a session for slice 160-1 and another session for slice 160-2. If UE 110-1 attempts to establish an emergency call through network slice 160-1 when the maximum number of terminals are already using slice 160-1, access node 155 may determine that UE 110-1 has a high UE ARP priority level for slice 160-1. Thus, access node 155 may apply remediation measures to ensure UE 110-1 can access slice 160-1. For example, if UE 110-2 (or another UE with low UE ARP priority) is using slice 160-1, access node 155 may initiate a procedure to deregister UE 110-2 from slice 160-1 to free resources for UE 110-1.

However, if UE 110-1 attempts to establish an Internet session through network slice 160-2 when the maximum number of terminals are already using slice 160-2, access node 155 may determine that UE 110-1 has a normal UE ARP priority level for slice 160-2. UE 110-1 would not have higher priority over UE 110-2 (or another UE with normal UE ARP priority) on slice 160-2. Thus, access node 155 may deny UE 110-1 access to slice 160-2.

The systems and methods described herein establish a UE ARP that can be defined per slice. The UE ARP can be stored as part of subscriber data in a core network (such as a Unified Data Repository) and provided to an access function (e.g., an Access and Mobility Management Function) during UE registration and updated through subscription. In addition, the UE ARP can also be provided by a policy function (e.g., a Policy Control Function) during UE registration and updated through access management policy association updates.

Figure 2:
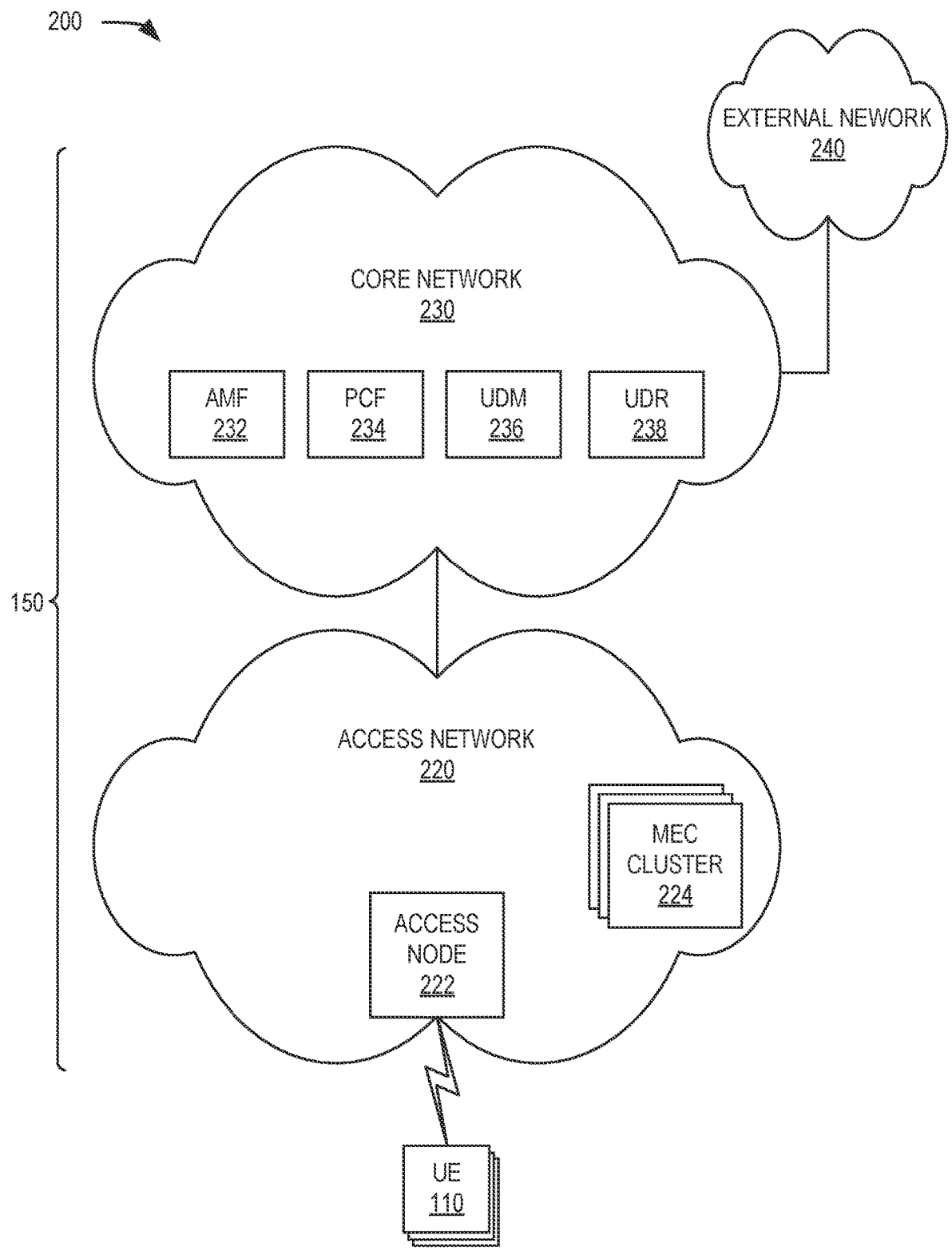
FIG. 2 is a diagram illustrating an exemplary network environment in which the systems and methods described herein may be implemented.

FIG. 2 illustrates an exemplary network environment 200 in which the systems and methods described herein may be implemented. As shown, environment 200 may include UEs 110, an access network 220, a core network 230, and an external network 240.

UE 110 may include a wireless communication device, a mobile terminal, or a fixed wireless access (FWA) device. Examples of UE 110 include a smart phone, a tablet device, a wearable computer device (e.g., a smart watch), a laptop computer, an autonomous vehicle with communication capabilities, a portable gaming system, and an Internet-of-Thing (IoT) device. In some implementations, UE 110 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. UE 110 may send packets to or over access network 220. As used herein, the terms "user," "subscriber," and/or "customer" may be used interchangeably. Also, the terms "user," "subscriber" and/or "customer" are intended to be broadly interpreted to include a user device (UE 110) or a user of a user device.

When UE 110 attaches to access network 220 for a service, UE 110 may send signals that include Single-Network Slice Selection Assistance Information (S-NSSAI). Access network 220 or network components therein may use the S-NSSAI to retrieve UE ARP and assign a priority for the subscriber in the slice corresponding to the S-NSSAI.

Access network 220 and a core network 230 may correspond to mobile network 150 of FIG. 1, for example. Access network 220 may include a radio access network (RAN) or another type of network that allows UE 110 to access core network 230. To do so, access network 220 may establish and maintain, with participation from UE 110, an over-the-air channel with UE 110; and maintain backhaul channels with core network 230. Access network 220 may convey information through these channels, from UE 110 to core network 230 and vice versa. Access network 220 may include a Long-Term Evolution (LTE) radio network, a Fifth Generation (5G) radio network and/or another advanced radio network. These radio networks may include many wireless stations and components referred to herein as an access node 222 (and also sometimes referred to as Integrated Access and Backhaul (IAB) nodes).

Access node 222 may correspond to access node 155 of FIG. 1, for example. Access node 222 may include a Fourth Generation (4G), 5G, or another type of wireless station and/or components (e.g., evolved Node B (eNB), next generation Node B (gNB), IAB nodes, Central Units (CUs), Distributed Units (DUs), Radio Units (RUs), etc.) that include one or more Radio Frequency (RF) transceivers. Access node 222 may have the capability to enforce UE priorities, such as those described above, based on the network slice on which a service is implemented. In the embodiments described herein, because different services are implemented on different network slices, access node 222 may be configured to use network slice identifiers (i.e., S-NSSAIs) that accompany a registration request to distinguish UE priorities for different services and to prioritize access in slices where a maximum number of terminals is reached. In particular, as described below, access node 222 may enforce admissions control and preemption based on UE ARP data obtained from core network 230.

As further shown, access network 220 may include Multi-Access Edge Computing (MEC) clusters 224. MEC clusters 224 may be located geographically close to wireless stations, and therefore also be close to UEs 110 serviced by access network 220 via wireless stations. Due to its proximity to UEs 110, MEC cluster 224 may be capable of providing services to UEs 110 with minimal latency. Depending on the implementations, MEC clusters 224 may provide many core functions at network edges. In other implementations, MEC clusters 224 may be positioned at other locations (e.g., in core network 230) at which MEC clusters 224 can provide computational resources for improved performance.

Core network 230 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, an LTE network (e.g., a 4G network), a 5G network, an ad hoc network, a telephone network (e.g., the Public Switched Telephone Network (PSTN), an intranet, or a combination of networks. Core network 230 may allow the delivery of Internet Protocol (IP) services to UE 110, and may interface with other networks, such as external network 240.

Depending on the implementation, core network 230 may include 4G core network components (e.g., a Serving Gateway (SGW), a Packet data network Gateway (PGW), a Mobility Management Entity (MME), etc.), 5G core network components (e.g., a User Plane Function (UPF), an Application Function (AF), an Access and Mobility Management Function (AMF), a Session Management Function (SMF), a Unified Data Management (UDM) function, a Network Slice Selection Function (NSSF), a Policy Control Function (PCF), a Unified Data Repository (UDR) etc.), or another type of core network components. In FIG. 2, core network 230 is illustrated as including AMF 232, PCF 234, UDM 236, and UDR 238, which are 5G core network components. Although core network 230 may include other 5G core network components, 4G core network components, or another type of core network components, they are not illustrated in FIG. 2 for simplicity.

AMF 232 may perform registration management, connection management, reachability management, mobility management, lawful intercepts, SMS transport for UE 110, management of messages between UE 110 and an SMF, access authentication and authorization, and location services management. AMF 232 may provide the functionality to support non-3$^{rd}$ Generation Partnership Project (3GPP) access networks, and/or other types of processes. According to implementations described herein, AMF 232 may retrieve and implement UE ARP for slice registrations and sessions. AMF 232 may be accessible by other function nodes via an Namf interface. AMF 232 may communicate with access node 222 (e.g., a gNodeB) via an N2 interface.

PCF 234 may support policies to control network behavior, provide policy rules to control plane functions (such as AMF 232), access subscription information relevant to policy decisions, perform policy decisions, and/or perform other types of processes associated with policy enforcement. PCF 234 may be accessible via an Npcf interface.

UDM 236 may maintain subscription information for UEs 110, manage subscriptions, generate authentication credentials, handle user identification, perform access authorization based on subscription data, maintain service and/or session continuity by maintaining assignment of an SMF for ongoing sessions, support SMS delivery, support lawful intercept functionality, and/or perform other processes associated with managing user data. UDM 236 may store, in a subscription profile associated with a particular UE 110, a UE ARP and location update information that includes information identifying an AMF 232 associated with the particular UE 110. UDM 236 may be accessible via a Nudm interface.

UDR 238 may provide a repository for subscriber information and other types of information that can be accessed by other components of core network 230. For example, UE ARP can be stored as part of subscriber data in UDR 238, retrieved by UDM 236, and provided to AMF 232 during registration and updated through subscription.

External network 240 may include networks that are external to core network 230. In some implementations, external network 240 may include packet data networks, such as an Internet Protocol (IP) network.

For simplicity, FIG. 2 does not show all components that may be included in network environment 200 (e.g., routers, bridges, wireless access point, additional networks, additional UEs 110, AMF 232, PCF 234, UDM 236, UDR 238, access node 222, MEC clusters 224, etc.). Depending on the implementation, network environment 200 may include additional, fewer, different, or a different arrangement of components than those illustrated in FIG. 2.

Figure 3:
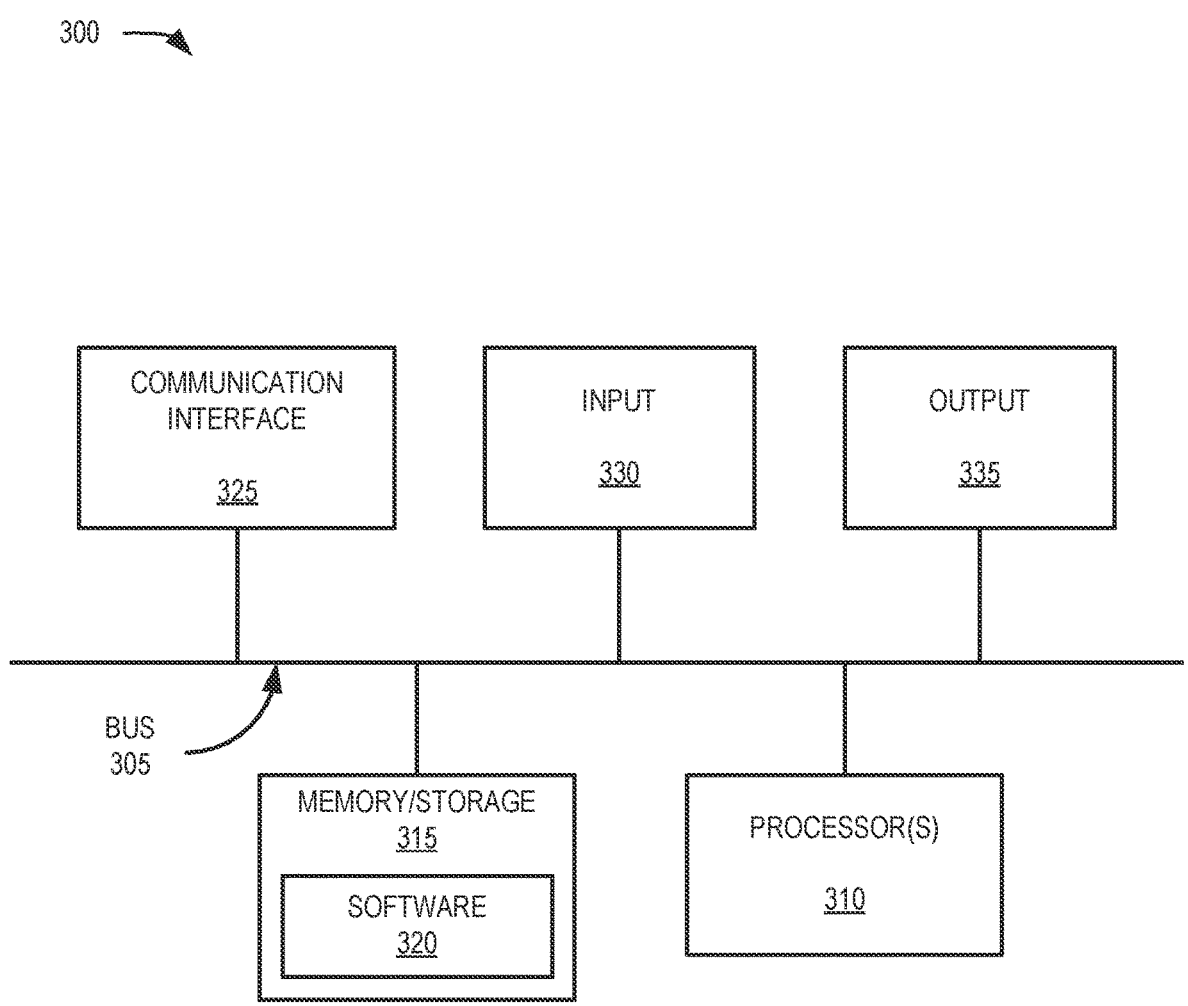
FIG. 3 is a diagram illustrating exemplary components of a device that may correspond to one or more of the devices described herein.

FIG. 3 is a diagram illustrating exemplary components of a device 300 that may correspond to one or more of the devices described herein. For example, device 300 may correspond to components included in access network 220, core network 230, UEs 110, AMF 232, PCF 234, UDM 236, UDR 238, access node 222, MEC clusters 224, and/or other elements illustrated in FIGS. 1 and 2. As illustrated in FIG. 3, according to an exemplary embodiment, device 300 includes a bus 305, one or more processors 310, memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc. Processor 310 may be a dedicated component or a non-dedicated component (e.g., a shared resource).

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include a drive for reading from and writing to the storage medium.

Memory/storage 315 may be external to and/or removable from device 300, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. Software 320 may include an operating system. Software 320 is also intended to include firmware, middleware, microcode, hardware description language (HDL), and/or other forms of instruction. For example, according to an implementation, software 320 may implement portions of slice orchestration platform 170.

Communication interface 325 permits device 300 to communicate with other devices, networks, systems, devices, and/or the like. Communication interface 325 includes one or multiple wireless interfaces and/or wired interfaces. For example, communication interface 325 may include one or multiple transmitters and receivers, or transceivers (e.g., radio frequency transceivers). Communication interface 325 may include one or more antennas. For example, communication interface 325 may include an array of antennas. Communication interface 325 may operate according to a protocol stack and a communication standard. Communication interface 325 may include various processing logic or circuitry (e.g., multiplexing/de-multiplexing, filtering, amplifying, converting, error correction, etc.).

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

FIGS. 4A and 4B are diagrams illustrating parameters of a UE ARP data type 400. According to an implementation, the parameters for UE ARP may be defined in a structured data type according to a format for wireless network standards, such as a 3GPP standard, or another schema.

As shown in FIG. 4A, the UE ARP data type 400 may include an attribute name 405, a data type 410 (i.e., "UeSnssaiArp"), a presence indicator (P) 415, a cardinality 420, and a description 425. Data type 410 (i.e., "map(ueSnssaiARP)") may allow many to many mapping of input values to output values according to regular expression mapping rules. Presence indicator 415 may indicate mandatory ("M") or optional ("O") inclusion of the UeSnssaiArp attribute in transmission of a subscription profile. According to an implementation, inclusion of the UeSnssaiArp attribute may be mandatory with transmission of a subscription profile. Cardinality 420 may indicate the number of characteristics for the attribute. For example, each attribute may be associated with only one S-NSSAI. The description 425 of the UeSnssaiArp data type may state that the UE ARP may be defined for each S-NSSAI of all the S-NSSAIs of a subscriber, and that the mapping key for each subscriber is the S-NSSAI.

As shown in FIG. 4B, each S-NSSAI 455 for subscriber may be associated with a priority level 460, a preemption capability 465, and a preemption vulnerability 470. Priority level 460 may define the relative importance of a resource request (e.g., the subscriber's relative priority for the network slice of the corresponding S-NSSAI). Priority level 460 may include, for example, a data type indicating a priority level (e.g., low, medium, high, etc.), a rank (e.g., 1, 2, 3, etc.), or another priority indication to be applied for the corresponding network slice (e.g., S-NSSAI 455). Preemption capability 465 may define whether a UE is eligible for resources (of the network slice) that have been already assigned to another UE with a lower priority level. Preemption vulnerability 470 may define whether a UE may lose the resources (of the network slice) previously assigned to it in order to admit a UE with higher priority level.

FIGS. 4A and 4B illustrate one form of an attribute data type that may be used for UE ARP data type 400. The number of attributes, the range of values for each priority level, and the representation of each attribute may differ in other implementations.

Figure 5:
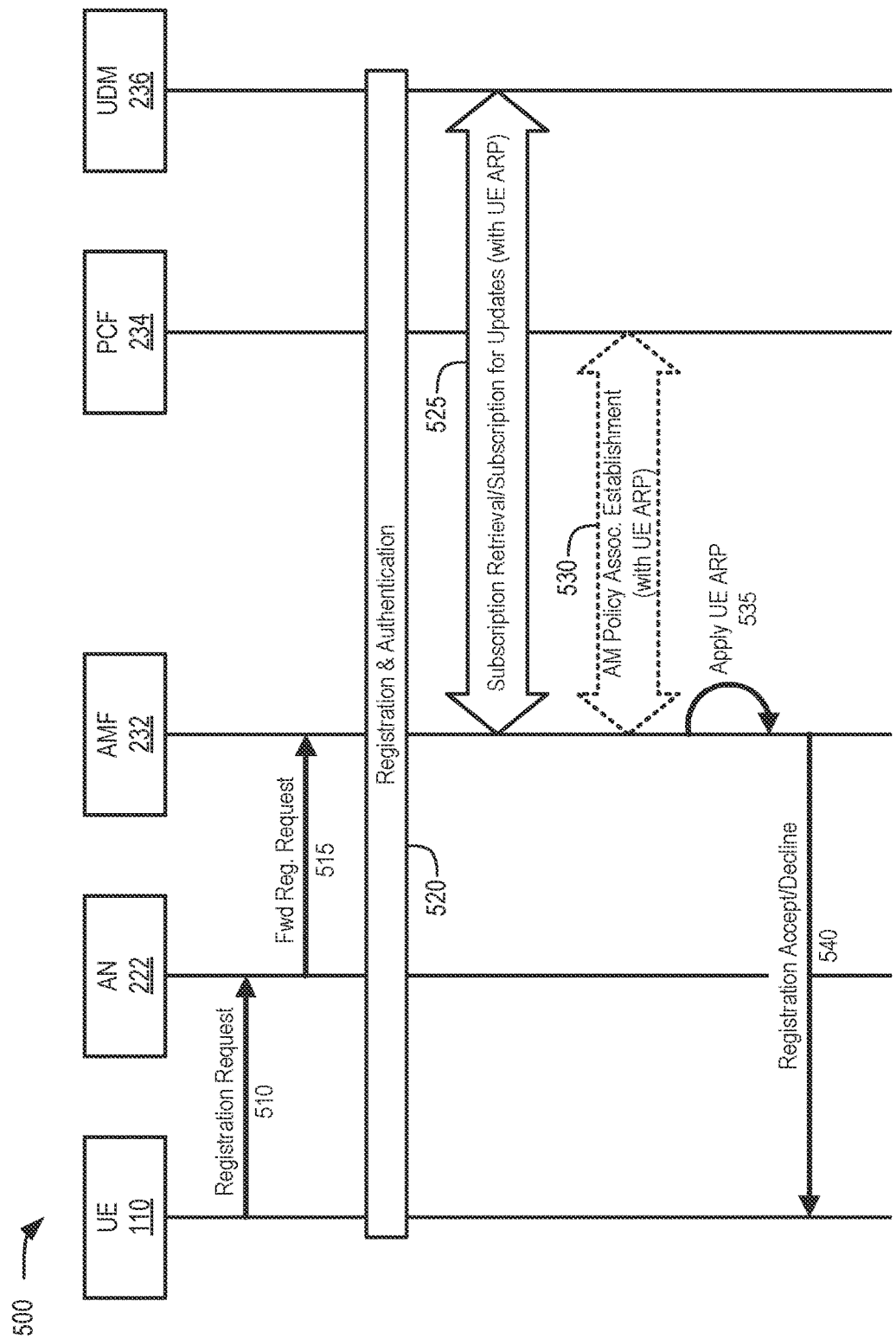
FIG. 5 is a diagram illustrating communications for a UE registration and UE ARP exchange in a wireless network.

FIG. 5 is a diagram illustrating communications for a UE registration and UE ARP exchange in a portion 500 of network environment 200. As shown in FIG. 5, network portion 500 may include UE 110, access node 222, AMF 232, PCF 234, and UDM 236. Communications of FIG. 5 may be repeated each time a UE 110 sends a registration request to request network service from network 150.

As shown in FIG. 5, UE 110 may send a Registration Request 510 to access node 222 with the subscriber's ID and S-NSSAI. The subscriber's ID may include, for example, the cellular telephone number of the UE 110, or a unique ID assigned to a user/subscriber of the UE 110. UE 110 may send Registration Request 510 to access node 222, for example, at UE 110 power-up to register with core network 230 such that UE 110 may begin receiving mobile network service. Access node 222 may receive Registration Request 510 and may forward the Registration Request (including the S-NSSAI) to AMF 232, as indicated at reference 515. AMF 232 subsequent to receiving the Registration Request from access node 222, may engage with access node 222 in performing registration and authentication processes 520 to register and authenticate UE 110 with core network 230.

As part of registration and authentication processes 520, AMF 232 may perform a subscription retrieval process 525 with UDM 236. UDM 236 may store (e.g., in UDR 238) the UE 110/subscriber's subscribed network service plan (e.g., a subscription profile) with the UE ARP. Through retrieval process 525, AMF 232 may retrieve via a Nudm interface the subscriber's subscription information from UDM 236, including the subscriber's subscribed UE ARP for the corresponding S-NSSAI. For example, UDM may provide UE ARP in the format described above in connection with FIGS. 4A and 4B.

Additionally as part of subscription retrieval process 525, AMF 232 may request subscriber network service updates/changes from the UDM 236, including changes in the subscriber's selected network service plan and/or UE ARP. AMF 232 may request notification of updates or changes in UE 110/subscriber's subscribed network service such that if UE 110/subscriber, for example, updates a network service plan for UE 110 and/or slice priority, then UDM 236 may send a notification to AMF 232 alerting AMF 232 to the change in the UE 110's network service subscription.

In some implementation of network environment 200, PCF 234 may be the final arbiter of policy decisions for a registration request. In such cases, AMF 232 may receive subscription information from UDM 236 and initiate an access management (AM) policy association establishment process 530 with PCF 234. For example, AMF 232 may provide the UE ARP for UE 110 to PCF 234, and PCF 234 may confirm or provide corrected UE ARP data to AMF 232 for the UE/S-NSSAI combination.

Once AMF 232 has received the UE ARP (and other subscriber data), AMF 232 may apply 535 the UE ARP configuration to the current network conditions for the network slice associated with the S-NSSAI. Assuming a maximum number of terminals are not currently active on the network slice (e.g., one of slices 160), UE ARP settings would not be applicable and AMF 232 may accept or decline 540 the registration request based on other admission control policies. For example, assuming correct authentication, AMF 232 may return a protocol data session (PDU) session ID to AN 201, which in turn may provide bearer setup information to UE 110. Application of UE ARP settings are described further in connection with FIG. 6.

Although FIG. 5 shows exemplary communications within network portion 500, in other implementations, different communications may be used than depicted in FIG. 5 to provide UE ARP to AMF 232. Additionally, the communications and signals explained and illustrated in FIG. 5 are exemplary and may not represent each and every signal that may be exchanged.

Figure 6:
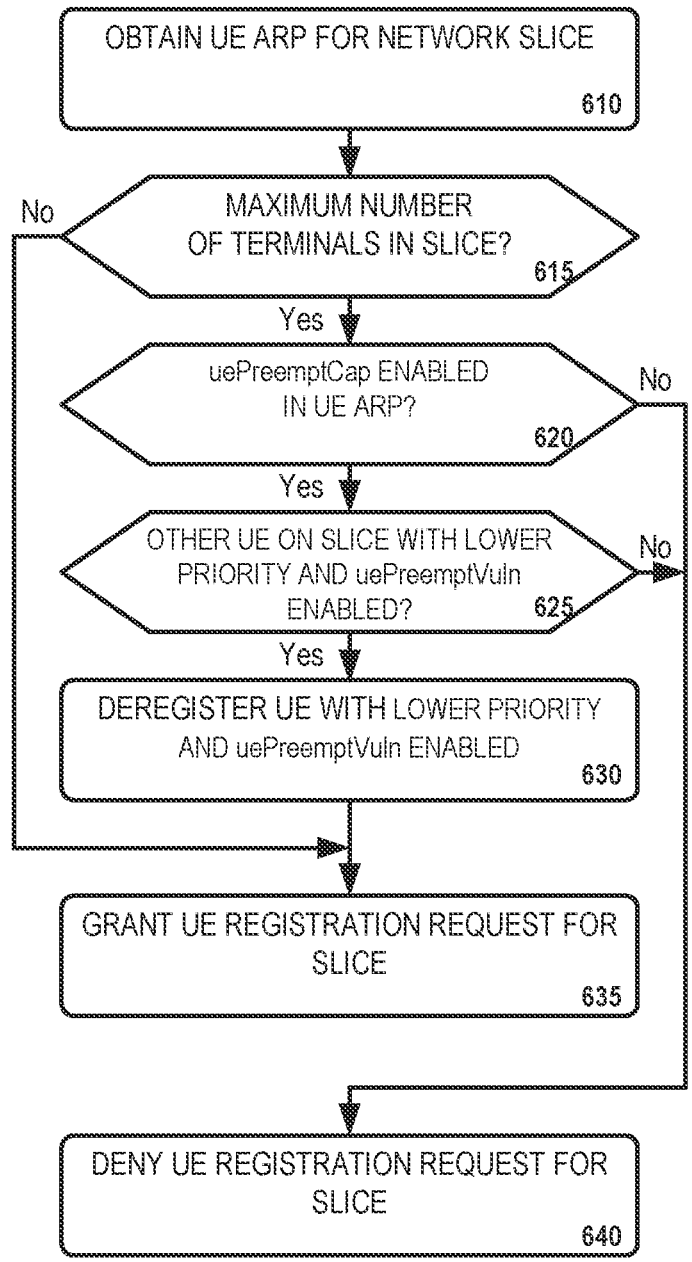
FIG. 6 is a flow diagram illustrating an exemplary process for enforcing UE ARP settings, according to an implementation described herein.

FIG. 6 is a flow diagram illustrating an exemplary process 600 for enforcing UE ARP settings, according to an implementation described herein. Process 600 may correspond to, for example, reference 535 of FIG. 5 above. In one implementation, process 600 may be implemented by AMF 232. In another implementation, process 600 may be implemented by AMF 232 in conjunction with one or more other devices in network environment 200.

Process 600 may include obtaining UE ARP for a network slice (block 610), and determining if a maximum number of terminals are using a slice corresponding to the registration request (block 615). For example, AMF 232 may receive a UE registration request (e.g., with S-NSSAI) that triggers retrieval of UE ARP for the corresponding UE/network slice. Additionally, or alternatively, AMF 215 may receive a subscription update from UDM 236 for any UE active on a network slice (e.g., slice 160). AMF 232 may directly or indirectly monitor the number of terminals using the network slice, in accordance with the maximum number of terminal defined in the slice configuration settings. For example, according to one implementation, AMF 232 may determine if maximum number of terminals are using a slice by obtaining updates from another NF in core network 230 about the number of terminals (e.g., UE devices) currently using the network slice.

If a maximum number of terminals are using the network slice (block 615—Yes) process 600 may further include determining if a preemption capability for the UE is configured in the UE ARP (block 620). For example, AMF 232 may retrieve a subscription profile for UE 110 in response to a registration request. The subscription profile may include UE ARP for the requested network slice. The UE ARP may indicate a priority level 460 for the UE on the network slice, along with a preemption capability 465, and a preemption vulnerability 470. Assuming the slice already has the maximum number of terminals, AMF 232 may apply the UE ARP.

If the UE ARP includes a preemption capability for the UE (block 620—Yes), process 600 may include determining if there is another UE active on the slice with a lower priority and preemption vulnerability enabled (block 625). For example, AMF 232 may identify the preemption capability 465 of UE 110. If UE 110 has a preemption capability set, AMF 232 may determine if there is an option to preempt another device so that UE 110 may be granted access to the slice.

If there is another UE active on the slice with a lower priority and preemption vulnerability (block 625—Yes), process 600 may include deregistering the UE with the lower priority and preemption vulnerability enabled (block 630), and granting the UE registration request for the slice (block 635). For example, if AMF 232 identifies another UE that has an UE ARP with a lower priority level 460 than the priority level for UE 110 and preemption vulnerability 470 enabled, AMF 232 may initiate procedures to deregister the lower priority UE from the network slice. If AMF 232 identifies multiple other UEs that are eligible to be deregistered, AMF 232 may select a lowest-priority UE (e.g., based on the respective UE ARP) of the eligible UEs or apply a random selection of among UEs having equal priority. According to an implementation, the deregistered UE may be provided with a back-off period to attempt to re-register. Concurrently, AMF 232 may grant access to UE 110 to access the slice.

If a maximum number of terminals are not using the network slice (block 615—No) process 600 may proceed directly to granting the UE registration request for the slice (block 635). That is, if there is capacity for the current number of terminals, AMF 232 may not apply the UE ARP.

If the UE ARP does not include a preemption capability for the UE (block 620—No), or if there is not another UE active on the slice with a lower priority and preemption vulnerability (block 625—No), then process 600 may include denying the UE registration request for the slice (block 640). For example, if there is not capacity in the network slice for additional terminals and the UE ARP does not provide a basis for preemption, AMF 232 may reject the registration request of UE 110 and provide a back-off period for a new registration request.

Systems and methods described herein employ an allocation and retention priority for UE devices, referred to as a UE ARP. The UE ARP may be defined per network slice, such that a subscriber can have different priority in different slices. According to one implementation, a network device receives, from a UE device, a registration request requesting access to a network slice and obtains a UE ARP. The UE ARP associates the UE device with a priority level on the network slice. When the network device determines that a maximum number of terminals are using the network slice, it applies the priority level in the UE ARP to grant or deny the UE device access to the network slice.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 6, and message flows with respect to FIG. 5, the order of the blocks and message flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a network device and from a user equipment (UE) device, a registration request requesting access to a network slice;
   obtaining, by the network device and from stored subscriber data for the UE device, a UE allocation and retention priority (UE ARP) for the network slice, wherein the subscriber data indicates different priority levels of the UE device for different network slices, and wherein the UE ARP associates the UE device with a priority level on the network slice;
   determining, by the network device, that a maximum number of other UE devices are using the network slice; and
   applying, by the network device, the priority level in the UE ARP to grant or deny the UE device access to the network slice.

2. The method of claim 1, wherein the UE ARP further includes a preemption capability setting and a preemption vulnerability setting for the UE device on the network slice.

3. The method of claim 1, wherein applying the priority level further comprises:
   determining, from the UE ARP, that a preemption capability is enabled for the UE device,
   determining that a preemption vulnerability is enabled for a different UE device on the network slice, wherein the different UE device has a lower priority for the network slice,
   granting the registration request for the UE device, and
   deregistering the different UE device from the network slice.

4. The method of claim 1, wherein applying the priority level further comprises:
   denying the registration request for the UE device when:
   a preemption capability is not enabled for the UE device, based on the UE ARP, or
   no other UE devices on the network slice has a lower priority and a preemption vulnerability enabled.

5. The method of claim 1, wherein the obtaining includes:
   receiving the UE ARP from a Unified Data Management (UDM) function of a core network.

6. The method of claim 1, wherein the obtaining includes:
   receiving the UE ARP from a Policy Control Function (PCF) of a core network.

7. The method of claim 1, wherein the obtaining includes:
   receiving the UE ARP as part of a subscription profile for the UE.

8. The method of claim 1, wherein the network device includes one of:
   an Access and Mobility Management Function (AMF), and
   an access node for a radio access network.

9. The method of claim 1, further comprising:
   storing the UE ARP in a Unified Data Repository (UDR);
   receiving an update to a subscription profile, wherein the update includes a change to the UE ARP, and
   notifying the network device of the update to the subscription profile.

10. A network device, comprising:
    a processor configured to:
    receive, from a user equipment (UE) device, a registration request requesting access to a network slice;
    obtain, from stored subscriber data for the UE device, a UE allocation and retention priority (UE ARP) for the network slice wherein the subscriber data indicates different priority levels of the UE device for different network slices, and wherein the UE ARP associates the UE device with a priority level on the network slice;
    determine that a maximum number of other UE devices are using the network slice; and
    apply the priority level in the UE ARP to grant or deny the UE device access to the network slice.

11. The network device of claim 10, wherein the UE ARP further includes a preemption capability setting and a preemption vulnerability setting for the UE device on the network slice.

12. The network device of claim 10, wherein, when applying the priority level, the processor is further configured to:
    determine, from the UE ARP, that a preemption capability is enabled for the UE device,
    determine that a preemption vulnerability is enabled for a different UE device on the network slice, wherein the different UE device has a lower priority for the network slice,
    grant the registration request for the UE device, and
    deregister the different UE device from the network slice.

13. The network device of claim 10, wherein, when obtaining the UE ARP, the processor is further configured to:
    receive the UE ARP from a Unified Data Management (UDM) function as part of a registration or authentication process for the UE.

14. The network device of claim 10, wherein the network device includes an Access and Mobility Management Function (AMF).

15. The network device of claim 10, wherein the processor is further configured to:
    receive, from a Unified Data Management (UDM) function and after granting the UE device access, an update to a subscription profile for the UE, wherein the update includes a change to the UE ARP.

16. A non-transitory computer-readable medium containing instructions executable by at least one processor, the computer-readable medium comprising one or more instructions for:
    receiving, from a user equipment (UE) device, a registration request requesting access to a network slice;
    obtaining, from stored subscriber data for the UE device, a UE allocation and retention priority (UE ARP) for the network slice, wherein the subscriber data indicates different priority levels of the UE device for different network slices, and wherein the UE ARP associates the UE device with a priority level on the network slice;
    determining that a maximum number of other UE devices are using the network slice; and
    applying the priority level in the UE ARP to grant or deny the UE device access to the network slice.

17. The non-transitory computer-readable medium of claim 16, further comprising one or more instructions for determining, from the UE ARP, that a preemption capability is enabled for the UE device, and granting, based on the preemption capability, the registration request for the UE device.

18. The non-transitory computer-readable medium of claim 17, further comprising one or more instructions for:

determining that a preemption vulnerability is enabled for a different UE device on the network slice, wherein the different UE device has a lower priority for the network slice, and deregistering, based on the preemption vulnerability, the different UE device from the network slice.

19. The non-transitory computer-readable medium of claim 16, wherein the instructions to obtain the UE ARP further comprise one or more instructions for:

receiving the UE ARP from a Unified Data Management (UDM) function, or receiving the UE ARP from a Policy Control Function (PCF).

20. The non-transitory computer-readable medium of claim 16, further comprising one or more instructions for receiving, from a Unified Data Management (UDM) function and after granting the UE device access, an update to a subscription profile for the UE, wherein the update includes a change to the UE ARP.

\* \* \* \* \*